United States Patent [19]

Suzuki et al.

[11] Patent Number: 4,633,460
[45] Date of Patent: Dec. 30, 1986

[54] TIME DIVISION SWITCHING SYSTEM

[75] Inventors: Taihei Suzuki, Kodaira; Takashi Morita; Hirotoshi Shirasu, both of Yokohama; Hiroshi Kuwahara, Kodaira; Eiichi Amada, Kokubunji, all of Japan

[73] Assignee: Hitachi, Ltd., Tokyo, Japan

[21] Appl. No.: 676,406

[22] Filed: Nov. 29, 1984

[51] Int. Cl.$^4$ .......................................... H04Q 11/04
[52] U.S. Cl. ..................................... 370/58; 370/66
[58] Field of Search .................. 370/58, 66, 56, 68, 370/65, 95, 96, 54; 179/27 CB

[56] References Cited

U.S. PATENT DOCUMENTS

| | | | |
|---|---|---|---|
| 3,760,103 | 9/1973 | Condon | 370/58 |
| 4,025,725 | 5/1977 | Euler | 370/66 |
| 4,074,072 | 2/1978 | Christensen et al. | 370/65 |
| 4,173,713 | 11/1979 | Giesken et al. | 370/65 |

Primary Examiner—Douglas W. Olms
Assistant Examiner—Wellington Chin
Attorney, Agent, or Firm—Antonelli, Terry & Wands

[57] ABSTRACT

This invention relates to a time division switching system for exchanging audio signals, data and so on in a time division manner. This time division switchboard comprises a plurality of separate local exchange units capable of interfacing with various different circuits such as subscriber lines, trunk lines, service circuits and so on, one or a plurality of junctor high ways connected to a time switch of each of the local exchange units, and one or a plurality of tandem exchange units each having a time switch connected to the other ends of the junctor high ways and switching by the time switch. Each of the local exchange units selects a channel on an arbitrary junctor high way and transmits control information concerning other one of the local exchange units to which a calling is to be sent, to one of the tandem exchange units which has the selected junctor high way connected thereto. The tandem exchange unit to which the control information is sent selects a channel on a junctor high way connected to the local exchange unit to which the call is to be sent, in response to the control information sent thereto, thereby switching the calling to the desired local exchange unit. Thus, since the respective units can be loosely coupled to each other, the time division switching system of this invention has high reliability and good economy.

9 Claims, 9 Drawing Figures

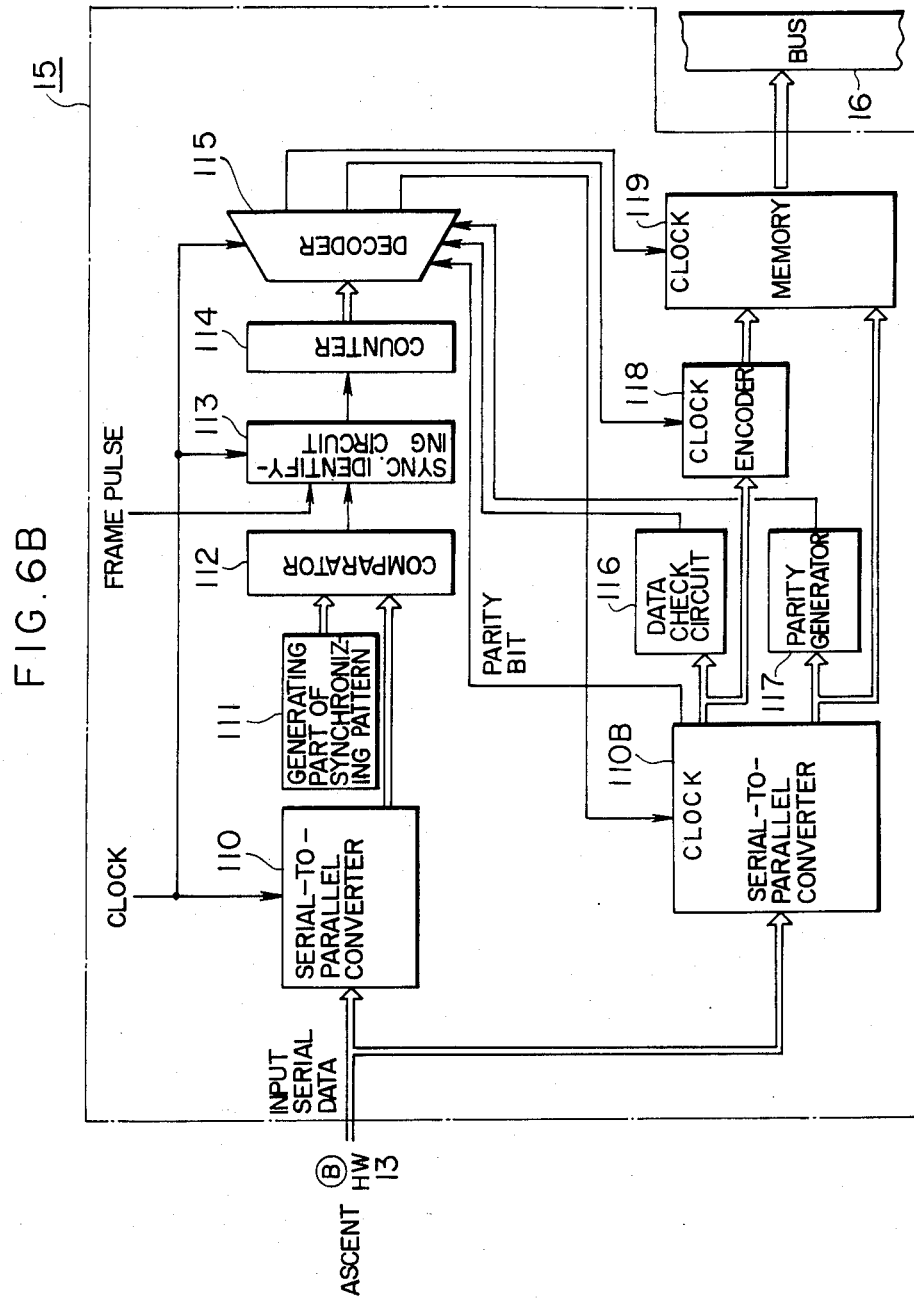

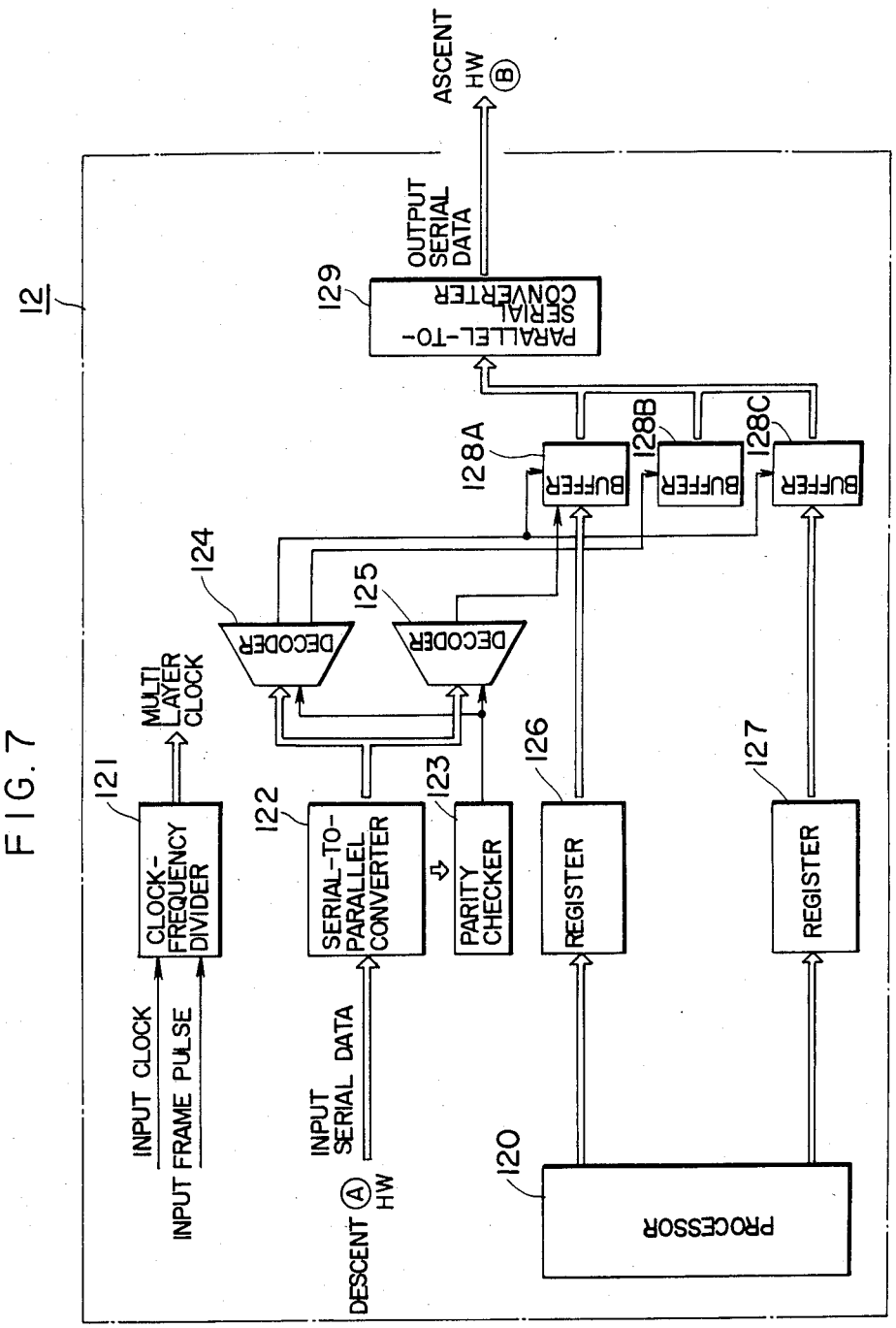

TIME DIVISION SWITCHING SYSTEM

BACKGROUND OF THE INVENTION

1. Field of the Invention

This invention relates to time division switching system for exchanging voice, data and so on in a time division manner, and particularly to a time division switching system constructed to combine the control and speech path systems and completely distribute thereby to improve the reliability and economy.

2. Description of the Prior Art

So far, a large-scale, high-speed single processor has been used as a control system for a time division switching system. This single processor, however, needs a large space for its installation because it must be duplicated for purposes of reliability. In addition, when a small number of circuits are used, unused parts and ability become large, and thus the processor is very expensive and provides a poor cost performance.

Recently, with the development of the LSI technology, excellent and inexpensive microprocessors have been produced, and now a multiprocessor formed of a plurality of microprocessors is generally used as the control system of the time division switching system.

In the conventional multiprocessor system, however, for example, the functions of a large-capacity processor were realized simply by a plurality of microprocessors, independently of the speech path system or the number of microprocessors was increased or decreased to meet the capacity of the speech path system using a building block construction.

Thus, in the prior art, since each speech path system is tightly coupled, the microprocessors are also tightly coupled with each other. Thus, even if the multiprocessors are dispersed in function share or load share, the amount of communication between the multiprocessors increases, greatly affecting the throughput (or time needed for the connection) and processing ability. In addition, once trouble occurs, the reliability of the system may be seriously lowered, depending on the mode of the trouble. Furthermore, the memory for the control of the speech path system is generally provided in common to the respective processors, and therefore causes a bottleneck particularly in a large system from the reliability point of view.

SUMMARY OF THE INVENTION

It is an object of the invention to provide a time division switching system with high reliability and economy by taking the complete distributed system structure for both the control system and the speech path system, thereby obviating the drawbacks of the prior art.

It is another object of the present invention to provide a wide range time division switching system capable of providing the same exchange system for both small and large systems.

It is still another object of the invention to provide a time division switching system having the best economy for the switching systems of any size.

In order to achieve the above objects, the present invention provides a time division switching system having a plurality of local exchange units each constructed to include various different circuits such as subscriber lines, trunk lines and service circuits, to carry out predetermined interfacing processes for the various different circuits, to time-division multiplex by line concentration or non-line concentration on highways connected to a time switch and to switch by the time switch at each time slot; one or a plurality of junctor highways connected to the time switch of each of the local exchange units, and one or a plurality of tandem exchange units each including a time switch connected to the junctor highways and switching by the time switch; each of the local exchange units being constructed to select a channel on any one of the junctor highways for a call to an external unit and to transmit information for controlling a local exchange unit to which the call is to be sent to a tandem exchange unit connected to the selected junctor highway, the tandem exchange unit being responsive to the control information to select a channel on a junctor highway connected to the local exchange unit to which the call is to be sent, thereby switching for the call.

In short, the whole exchange system is formed by local exchange units which are independent of each other and each of which interfaces with various different tandem exchange units which are independent of each other, and junctor highways connected between these units, and a particular channel on a junctor highway is used for control, thereby enabling the exchange of information and the loose coupling between the units.

BRIEF DESCRIPTION OF THE DRAWINGS

A preferred embodiment of the present invention will now be described in conjunction with the accompanying drawings, in which:

FIGS. 6A and 6B are block diagrams of an example of the pollng control circuit in this embodiment; and FIG. 7 is a block diagram of an example of the interface circuit in this embodiment.

DESCRIPTION OF THE PREFERRED EMBODIMENTS

Figure 1:
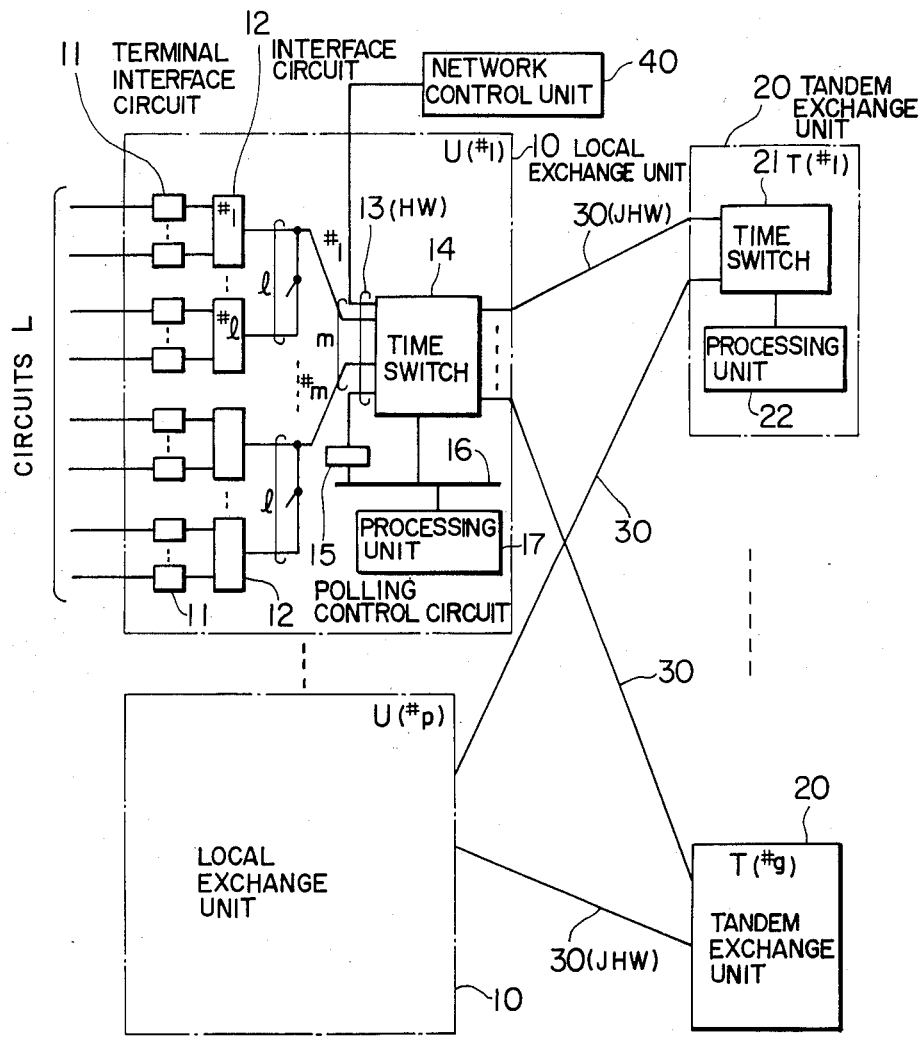
FIG. 1 shows the system structure in one embodiment of a time division switching system.

The embodiments of a time division switching system of the invention will be described with reference to the accompanying drawings. FIG. 1 shows one embodiment of a time division switching system of the invention. Referring to FIG. 1, there are shown local exchange units 10 (U#1 to U#p). Each of the units 10 includes terminal interface circuits 11 to which various circuits L such as analog or digital subscriber lines, trunk lines, service circuits and so on are connected, interface circuits 12 (#1 to #l for each group, each connected to a plurality of the terminal interface circuits 11, high ways 13 (HW#1 to HW#m) each multiplexing a predetermined number 1 of interface circuits 12, a time switch 14 to which the high ways are connected, a polling control circuit 15 connected to the time switch 14, a bus 16, and a processing unit 17 connected to the time switch 14. Shown at 20 are tandem exchange units (T#1 to T#q), each of which includes a time switch 21 and a processing unit 22. Shown at 30 are junctor highways (JHW) for interconnecting the local exchange units 10 and the tandem exchange units 20, and at 40 is a network control unit connected to the time switch 14 of an arbitrary one of the local exchange units 10.

Description will be made of the polling operation at the time of detecting a change of condition in a circuit L (for example, subscriber calling, incoming, transmission and reception of a number, charging pulse sending, release and so on, each of which is, hereinafter, simply called the occurrence of an event).

Figure 2:
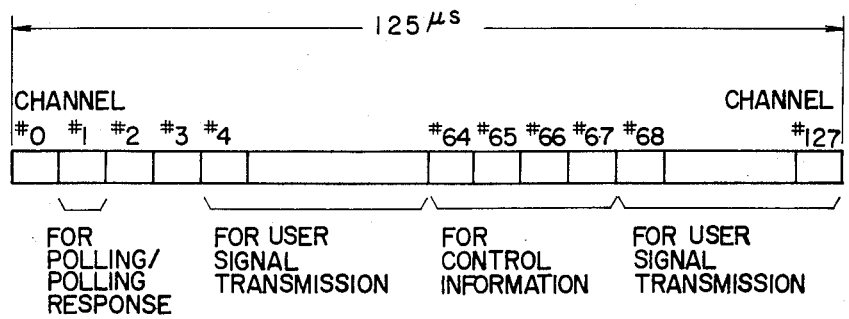
FIG. 2 shows a format in which channels are assigned to the highway in this embodiment.
Figure 3:
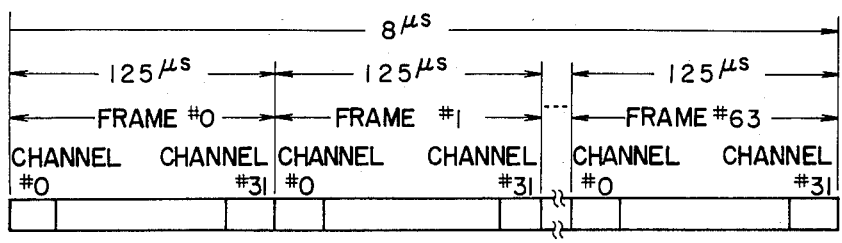
FIG. 3 shows a format of the polling channel pattern in this embodiment.

FIG. 2 shows the format in which channels are assigned to each of the highways (HW) as shown in FIG. 1. FIG. 3 shows the format of the polling channel pattern in FIG. 1.

The polling control circuit 15 shown in FIG. 1 controls identification information (for example, a number) of a particular one, for example, #1 of the interface circuits 12 associated with a particular one, for example, #1 of the highways 13 to be written, for example, on a channel #0 of a frame #0 at intervals of 8 ms as shown in FIG. 3.

The information on channel #0 is sent through the particular highway 13 (#1) to the time switch 14 where it is exchanged in time slot, and then it is carried on the decending channel #1 of the high way 13 (#1) as, for example, shown in FIG. 2.

The interface circuit 12 (#1), which previously stores its own number #1, compares its own number with the content (a number) of the channel #1. If the numbers are equal, the polling is decided to be for the interface 12 (#1).

When an event occurs at the interface circuit 12 (#1), it responds to the polling to supply its own number (#1) and a request for communication with the processing unit 17 on the ascending channel #1 of the highway 13 (#1) as shown in FIG. 2.

The ascending channel (#1) of the highway 13 (#1) is exchanged by the time switch 14 and then coupled to the polling control circuit 15 through the corresponding highway 13.

The polling control circuit 15 processes the response by making multi-frames in a channel pattern as shown in FIG. 3 or by storing them in a first-in first-out memory, to thereby detect the request for the communication with the processing unit 17, transmitted from the interface circuit 12 (#1) associated with the highway 13 (#1), and sends this information through the bus 16 to the processing unit 17.

The processing unit 17 communicates with the interface circuit 12 (#1) by use of, for example, channels #64 to #67 or one of these channels as shown in FIG. 2.

Thus, by the sequence of such operations, it is possible to transmit the service request received by the terminal interface circuit 11, through the interface circuit 12 to the processing unit 17 and to execute the process for the event.

If necessary, a plurality of channels may be used for the polling.

The communication between the local exchange unit 10 and the tandem exchange unit 20 will be described below.

Figure 4:
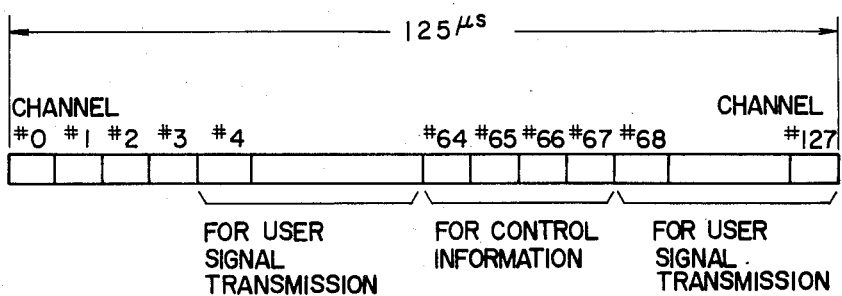
FIG. 4 is a format in which channels are assigned to the junctor highway in this embodiment.
Figure 5A:
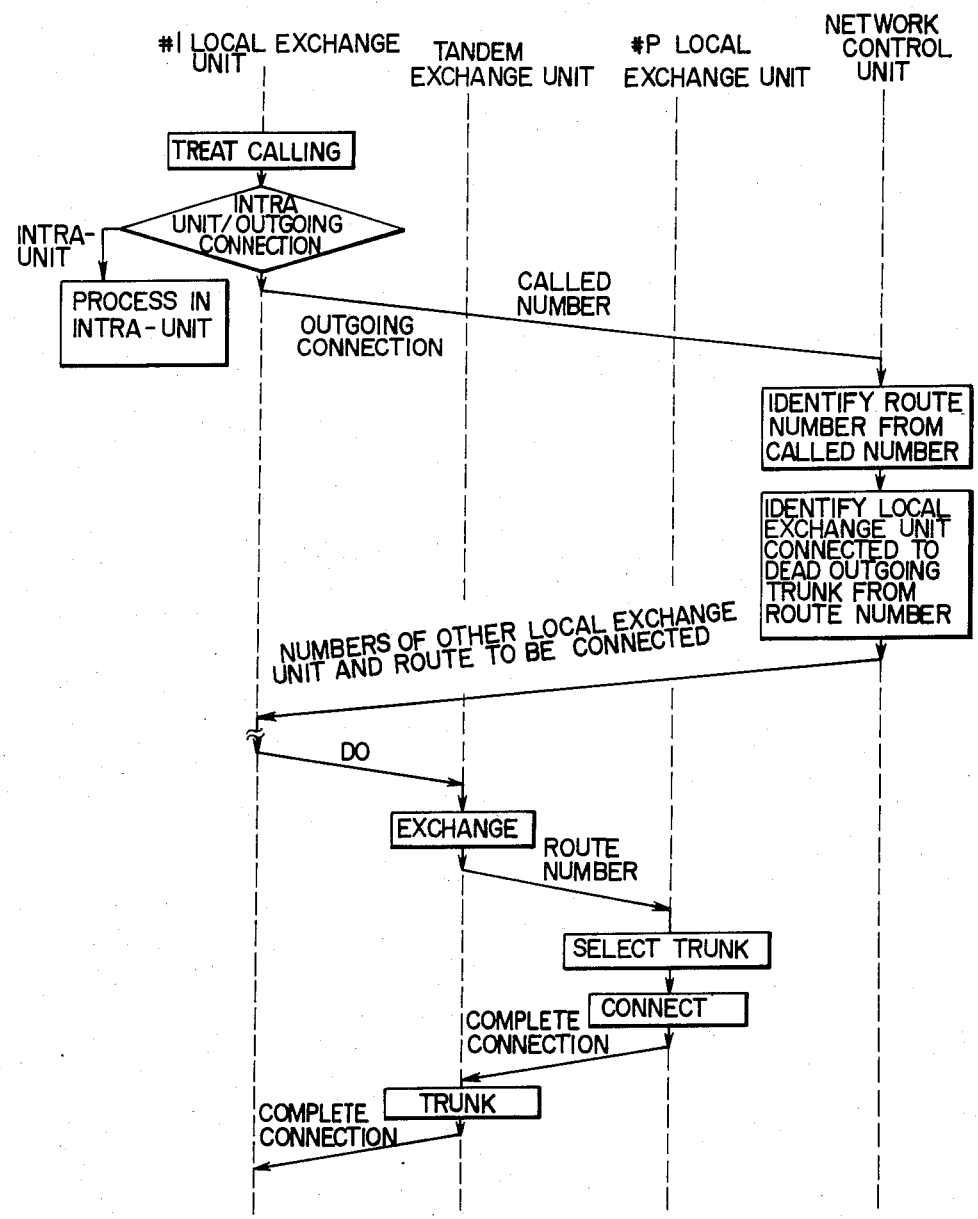
FIGS. 5A and 5B show sequences of communications for outgoing connection in this embodiment.
Figure 5B:
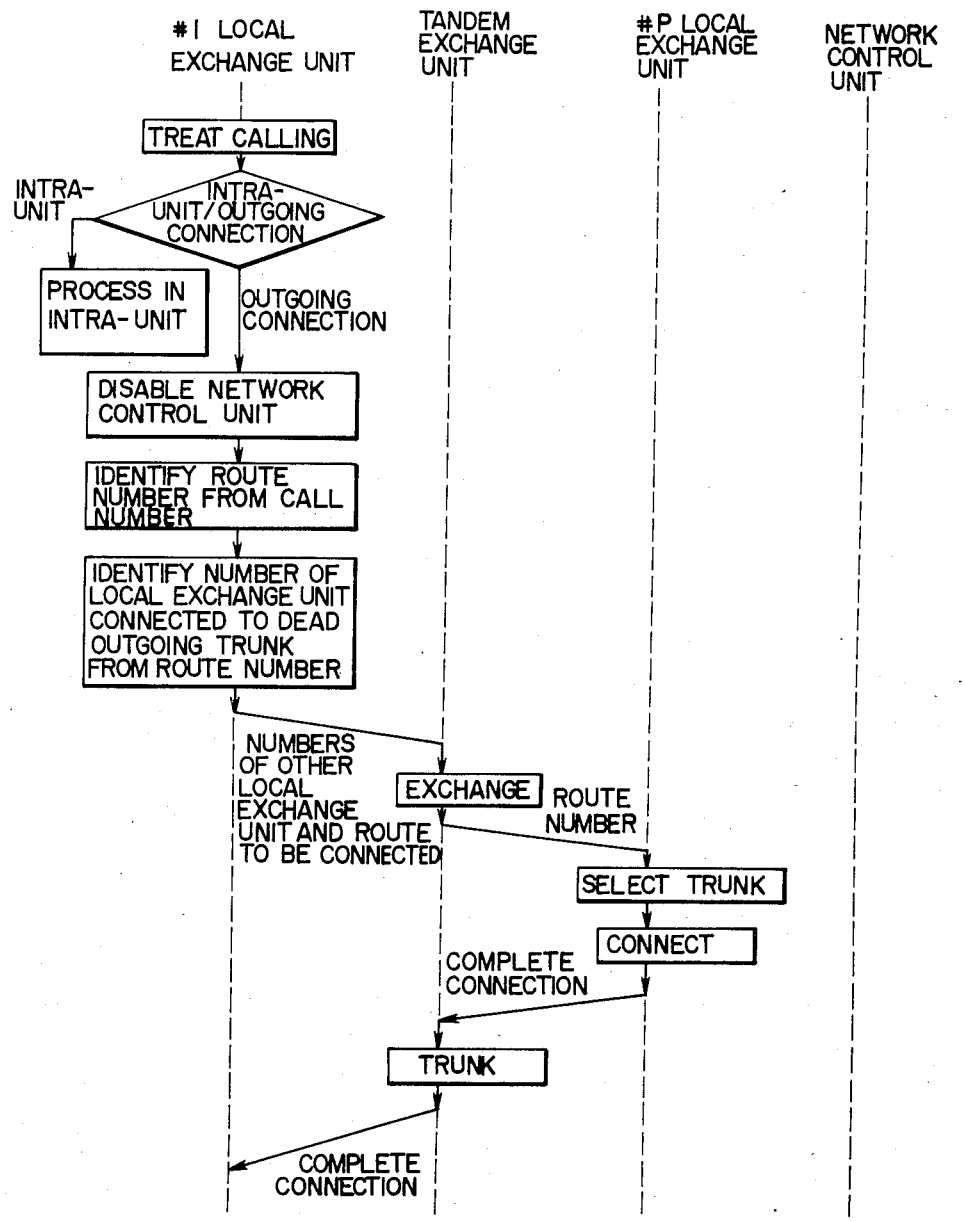

FIG. 4 shows the format in which channels are assigned to each of the junctor highways in FIG. 1, FIGS. 5A and 5B show sequences of communications for outgoing connection.

When the processing unit 17 of the local exchange unit 10 (for example, #1) decides that a call is required to be transmitted to another local exchange unit 10 (for example, #p), a junctor highway 30 between the local exchange unit 10 (#1) and the tandem exchange unit 20 (for example, #1) is used and a channel is specified thereon (a communication channel for service is selected). Then, the identification number (for example, number p) of the destination, or the local exchange unit 10 (#p) and the route number information are transmitted on the channels #64 to #67 to the tandem exchange unit 20 (#1), as for example, shown in FIG. 4.

In this case, the tandem exchange unit 20 is used which is connected to the junctor highway 30 having a selected unused channel or a channel which a call associated with the control information utilizes.

The processing unit 22 controls the time switch 21 to exchange on the basis of the information, and transmits the route number and so on through the junctor highway 30 to the destination, or the local exchange unit 10 (#p) where the process is executed.

The time switch 21, which is constructed to have full availability and non-blocking, is able to exchange irrespective of whether the junctor highway 30 is in the ascending or descending condition. This is also true for the local exchange unit 10.

The operation for the outgoing connection will be described.

When a call within the local exchange unit 10 (for example, #1) itself needs an outgoing connection (for example, route #1), the local exchange unit 10 (#1) transmits outgoing information (for example, a called subscriber number) to the network control unit 40 (in the Figure, for example, it is connected to the time switch 14 through the highway 13 of the local exchange unit 10 (#1)) which can be accessed from each of the local exchange units 10 (#1 to #p), through the junctor high way 30 and a particular channel of the highway 13.

The network control unit 40 as shown in FIG. 5A, identifies the route #1 from the received called subscriber number and selects the local exchange unit 10 (for example, #p) which has an unused outgoing trunk for the route #1, identifying the number, by using all-busy information and dead-line occurrence information of each route received from each local exchange unit 10 and accumulated in a display table.

If there is no idle line in the route #1 (all-busy), alternative processing is performed, if necessary to select another route number, specifying one of the local exchange units 10 in the same way as above.

The network control unit 40 transmits to the local exchange unit 10 (#1) necessary information concerning the route #1 and information for connection to the local exchange unit (#p).

The local exchange unit 10 (#1) transmits information for connection to the local exchange unit 10 (#p) and route information (#1) to the tandem exchange unit 20 in accordance with the method of transmission and reception between the local exchange unit 10 and the tandem exchange unit 20.

The tandem exchange unit 20 performs the connection to the local exchange unit 10 (#p) and transmits information of route #1.

The local exchange unit 10 (#p) thus carries out a necessary outgoing connection on the basis of the information of route #1.

A single network control unit 40 is provided for the system, and is assigned to a fixed channel for communication with the processing unit 17 of each local exchange unit.

When the network control unit 40 cannot operate due to trouble or the like, as shown in FIG. 5B, the local exchange unit 10 (#1) identifies this situation and it selects and identifies the local exchange unit 10 (#p) having the outgoing trunk of route #1 from its own table listing the routes connected to the local exchange units 10. Then it sends the information of the connection to the selected local exchange unit and the transmission and reception of information, to the tandem exchange unit 20. After the sequence of the operations, a desired outgoing connection can be realized.

In this case, since each local exchange unit 10 not only can detect each idle route or all-busy situation, but also can perform alternative processing, a busy condition after determination of an outgoing trunk will result in repeated trial or loss of calling. The special condition that the network control unit 40 encounters a trouble corresponds to the breakdown of the conventional system, but it is extremely effective that calling can be connected, although slight reduction of service is inevitable.

Finally, the polling control circuit 15 and the interface circuit 12 will be described in detail.

Figure 6A:
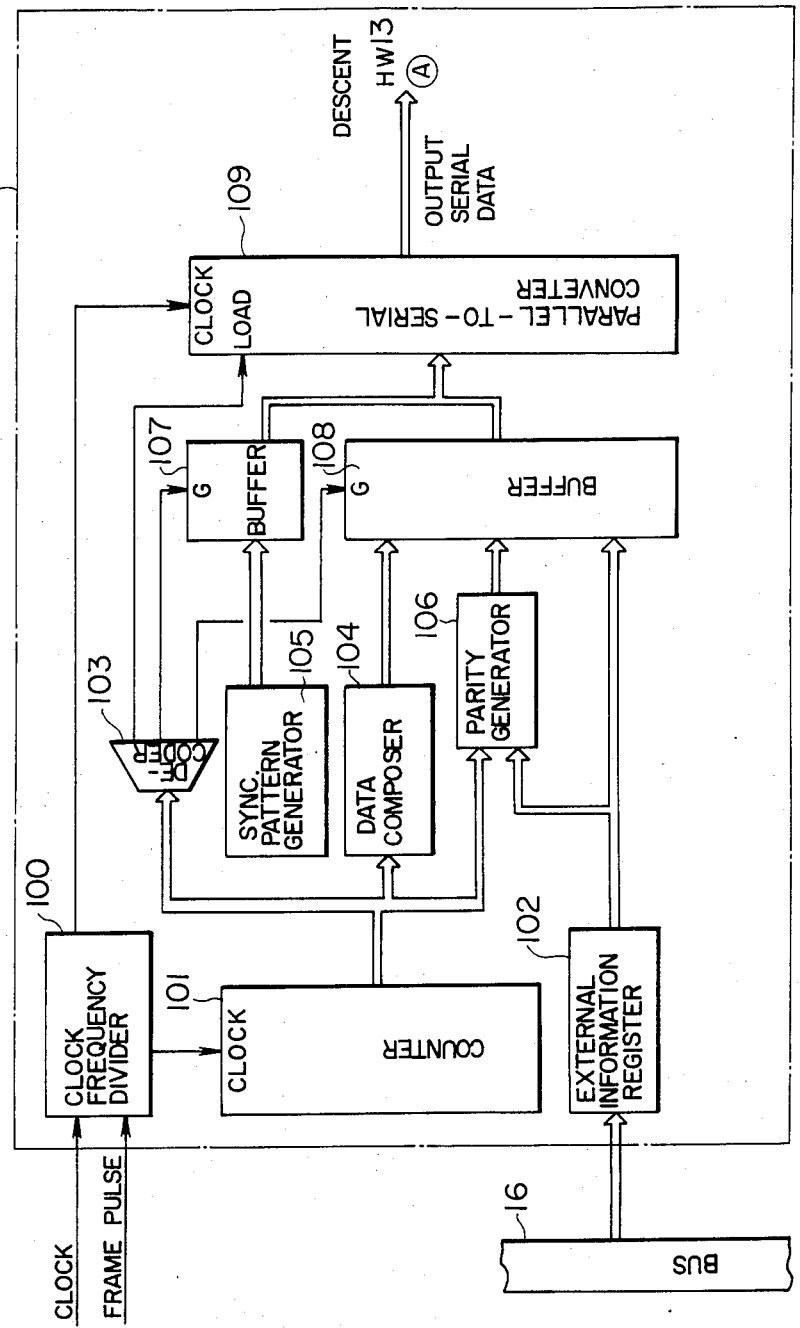

FIGS. 6A and 6B are a block diagram of one example of the polling control circuit 15 in a time division switching system according to this invention. FIG. 6A shows a main part (descent) of the polling transmitting selection and FIG. 6B shows a main part (ascent) of the polling response receiving section. FIG. 7 is a block diagram of one example of the interface circuit 12, or shows a main part relating to the transmission and reception of polling.

Referring to FIG. 6A, a clock-frequency divider 100 is responsive to a clock and a frame pulse to produce a multilayer clock, which is then distributed to each part.

A counter 101 counts the clock from the divider 100 and supplies information of bits to a decoder 103 for expanding/decoding the frame number and channel number on the time-division multiplexing highways, a data composing circuit 104 for composing data to be inserted within a channel and a parity generator 106 for adding a parity bit.

The information from the external, for example, information of the operation mode (ordinal use/standby, or operation/stop) is stored in an external information register 102 from a first-in first-out memory 119 which will be described later.

The synchronizing pattern at the head of a frame is produced at a synchronizing pattern generating circuit 105 and buffered by a buffer 107. The polling information and the mode specifying information to be sent to the terminals are buffered at a buffer 108.

The information within the buffers 107 and 108 are supplied to a parallel-to-serial converting circuit 109 at the timing of the outgoing channel and then carried on the highway 13 (HW) as serial data.

The operation of the polling response receiving section of FIG. 6B will hereinafter be described.

The time switch 14 selects the highway 13 connected to the polling control circuit 15, of the highways 13 (HW) to which the interface circuit 12 has sent data with the synchronizing pattern added.

Through this highway 13 are supplied a clock pulse, a frame pulse and serial data to the polling control circuit 15 from a unit not shown.

The clock-frequency divider 100 shown in FIG. 6A receives a frame pulse and produces a multilayer clock which is distributed to each part.

The serial data on the receiving highway 13 is converted to parallel data at a serial-to-parallel converting circuit 110A. This parallel data is compared with the output from a synchronizing pattern generator 111 in a comparator 112. Then, the output of the comparator 112 is supplied to a synchronizing identifying circuit 113 where the synchronizing pattern is identified. The output of the synchronizing identifying circuit 113 is supplied to a decoder 115 through a $10^6$ counter 114. After synchronizing is established, data of polling response is supplied through another serial-to-parallel converting circuit 110B to a data check circuit 116, a parity generator 117 and an encoder 118.

If the data is found to be correct as a result of checking, it is written in the first-in first-out memory 119. Under control of software, the content of the memory 119 is read periodically through the bus 16, and thereby it can be known which interface circuit 12 requests communication.

Furthermore, referring to FIG. 7, the data from the polling control circuit 15 is switched by the time switch 14 to the highway 13 connected to the corresponding interface circuit 12. The synchronizing pattern at the head of the frame is identified before it is supplied to the interface circuit 12, although not shown, and the clock, frame pulse and highway serial data are supplied to the interface circuit 12. The synchronizing pattern on the transmitting highway is also added by a separate unit not shown.

A clock-frequency dividing circuit 121 receives the clock and frame pulse and produces a multilayer clock necessary within the interface circuit 12. This multilayer clock is distributed to each part although not shown.

A serial-to-parallel converting circuit 122 controls a decoder 124 to decode the data concerning the operation modes, of the serial data received, for example, to identify the general operation mode (on-line state), test mode and maintenance operation mode. A decoder 125 analyzes the polling information and identifies whether it is its own number or not (or whether the corresponding interface circuit 12 needs the communication with the processing unit 17).

At the same time, the output of the serial-to-parallel converting circuit 122 is supplied through a parity checker 123 to the decoders 124 and 125.

If the interface circuit 12 requires communication with the processing unit 17, a processor 120 supplies this request to a register 126 for polling response information where it is written, and thus in the general operation mode, the contents of the register 126 are supplied to a buffer 128A. In the test mode, if a fixed pattern is returned for test, the corresponding pattern held in a buffer 128B is supplied to the highway 13 in the test mode. In the maintenance/operation mode, if maintenance information is written in a register 127 from the external, the contents of the register are supplied to a buffer 128C.

The contents of the buffers 128A, 128B and 128C are supplied to a parallel-to-serial converting circuit 129 at the timing of the transmission, and the serial data therefrom is carried on the highway (HW) 13.

Here, although the identification of the synchronizing pattern at the time of receipt thereof, the extraction of the clock and frame pulse, the addition of the synchronizing pattern at the time of transmission and the superposition of clock and frame pulse, are performed by a unit not shown, they can be executed in the interface circuit 12.

Of course, this invention is not limited to the above embodiments, but may take various changes and modifications. Although the connections within the intraoffice connection, incoming connection and so on are the same as in the prior art were not described, the scope of present invention is similarly not limited by this fact.

Thus according to this invention, since both the control system and speech path system are completely distributed and loosely coupled with each other, the reliability and economy of the time division switching system are remarkably improved.

Moreover, according to this invention, both small and large systems can use the same switchboard system.

Furthermore, in telephone officed of every size, the greatest economy can be achieved.

We claim:

1. A time division switching system for effecting interconnection between selected ones of a plurality of terminal circuits, comprising:
   (a) a plurality of local exchange units each connected to a respective group of terminal circuits, each local exchange unit including a plurality of terminal interface means connected to respective ones of a group of terminal circuits for carrying out a predetermined processing for said terminal circuits, a plurality of local highways, multiplexing means connecting respective groups of said terminal interface means to respective ones of said local highways for effecting time division multiplexing of signals on said local highways, a first time switch connected to said local highways for time switching signals between said local highways during respective time slots of a repetitive time frame, control means connected to said first time switch for sending and receiving control information to and from said terminal interface means on said local highways and for controlling said first time switch;
   (b) a plurality of junctor highways each connected to a respective one of said first time switches in said plurality of local exchange units; and
   (c) at least one tandem exchange unit including a second time switch connected to said plurality of junctor highways for switching between said junctor highways during respective time slots of a repetitive time frame and control means for controlling said second time switch on the basis of control information received on said junctor highways from said local exchange units;
   wherein said first time switch in each local exchange unit transmits during each time slot on a respective local highway signals in the form of a plurality of signal channels, particular ones of said signal channels being assigned to carry control information and other signal channels being assigned to carry data signals for said terminal circuits.

2. A time division switching system according to claim 1, wherein said control means in each local exchange unit includes polling means connected to said first time switch for inserting a polling signal for a respective terminal interface means in a selected signal channel of the signals transmitted on said local highways, each of said terminal interface means including means responsive to a service request from a terminal circuit connected thereto and a polling signal from said polling means for inserting a response signal in said selected signal channel, and said control means further includes processor means connected to said first time switch and responsive to a response signal being transmitted in said selected signal channel for transmitting to the terminal interface means which provided said response signal control information in said particular ones of said signal channels for controlling the processing in said terminal interface means.

3. A time division switching system according to claim 1, wherein the first time switches of each of said local exchange units have a non-blocking construction so that said signal channels can be selected irrespective of the condition in which the channels on the outgoing junctor highway are used.

4. A time division switching system for effecting interconnection between selected ones of a plurality of terminal circuits, comprising:
   (a) a plurality of local exchange units each connected to a respective group of terminal circuits, each local exchange unit including a plurality of terminal interface means connected to respective ones of a group of terminal circuits for carrying out a predetermined processing for said terminal circuits, a plurality of local highways, multiplexing means connecting respective groups of said terminal interface means to respective ones of said local highways for effecting time division multiplexing of signals on said local highways, a first time switch connected to said local highways for time switching signals between said local highways during respective time slots of a repetitive time frame, control means connected to said first time switch for sending and receiving control information to and from said terminal interface means on said local highways and for controlling said first time switch;
   (b) a plurality of junctor highways each connected to a respective one of said first time switches in said plurality of local exchange units; and
   (c) at least one tandem exchange unit including a second time switch connected to said plurality of junctor highways for switching between said junctor highways during respective time slots of a repetitive time frame and control means for controlling said second time switch on the basis of control information received on said junctor highways from said local exchange units;
   wherein said first time switch in each local exchange unit transmits during each time slot on a respective junctor highway signals in the form of a plurality of signal channels, particular ones of said signal channels being assigned to carry control information and other signal channels being assigned to carry data signals to said tandem exchange unit.

5. A time division switching system according to claim 4, wherein said second time switch in said tandem exchange unit has a non-blocking construction so that said signal channels can be selected irrespective of the condition in which the channels on the outgoing junctor highway are used.

6. A time division switching system according to claim 4, wherein said control means in each local exchange unit includes means for inserting into said particular ones of said signal channels signals forming control information as to the identity of another local exchange unit to which data is to be transmitted and a route number identifying a local highway in that other local exchange unit on which the data is to be carried to a particular terminal circuit, in said tandem exchange unit and the control means in said other local exchange unit.

7. A time division switching system according to claim 6, further including network control means connected to the first time switch of one of said local exchange units and accessible therethrough by the other local exchange units for generating said control information on the basis of terminal circuit identification information and the busy/free condition of said local exchange units and said junctor highways.

8. A time division switching system according to claim 7, wherein said network control means includes a table having information as to each route formed by said junctor highways and all-busy information as to each of said local exchange units, said table being updated on the basis of the condition of each route by each of said local exchange units, each of said local exchange units including means for accessing said network control unit when an outgoing connection is to be established to transmit terminal circuit identification information to said network control unit, and said network control unit is responsive to said terminal circuit identification information to send the number of the local exchange unit and an outgoing route designation corresponding to outgoing connection information back to said local exchange unit on the basis of the information in said table, so that said local exchange unit can perform outgoing connection on the basis of said outgoing connection information and said local exchange unit number.

9. A time division switching system according to claim 8, wherein each of said local exchange units has fixed data for specifying one of said local exchange units on the basis of said outgoing connection information, so that when said local exchange unit cannot access said network control unit upon outgoing connection, said fixed data is used to select an outgoing route for outgoing connection.

* * * * *